(12) United States Patent
Woodall et al.

(10) Patent No.: US 8,988,972 B1
(45) Date of Patent: Mar. 24, 2015

(54) VARIABLE SHOCK WAVE BIO-OIL EXTRACTION SYSTEM

(71) Applicants: Robert Woodall, Panama City, FL (US);
Steven F. Naud, Lynn Haven, FL (US);
Felipe A. Garcia, Panama City, FL (US)

(72) Inventors: Robert Woodall, Panama City, FL (US);
Steven F. Naud, Lynn Haven, FL (US);
Felipe A. Garcia, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 247 days.

(21) Appl. No.: 13/736,683

(22) Filed: Jan. 8, 2013

(51) Int. Cl.
*G10K 11/00* (2006.01)
*G10K 11/34* (2006.01)
*G01S 1/72* (2006.01)

(52) U.S. Cl.
CPC .. *G10K 11/34* (2013.01); *G01S 1/72* (2013.01)
USPC .......................................................... 367/142

(58) Field of Classification Search
USPC .................................. 367/142; 435/72; 554/8
See application file for complete search history.

(56) References Cited

U.S. PATENT DOCUMENTS

| | | | |
|---|---|---|---|
| H1568 H * | 8/1996 | Huang et al. | 210/748.02 |
| 2005/0026262 A1* | 2/2005 | Yoshitani et al. | 435/167 |
| 2006/0172405 A1* | 8/2006 | Yoshitani et al. | 435/252.1 |
| 2010/0124583 A1* | 5/2010 | Medoff | 426/2 |
| 2012/0095245 A1* | 4/2012 | Lane et al. | 554/8 |
| 2012/0111322 A1* | 5/2012 | Mahamuni et al. | 127/46.1 |
| 2013/0011895 A1* | 1/2013 | Medoff et al. | 435/162 |
| 2013/0116459 A1* | 5/2013 | Marrone et al. | 554/175 |
| 2013/0189407 A1* | 7/2013 | Chin et al. | 426/238 |

* cited by examiner

*Primary Examiner* — Isam Alsomiri
*Assistant Examiner* — James Hulka
(74) *Attorney, Agent, or Firm* — James T. Shepherd

(57) ABSTRACT

A variable shock wave bio-oil extraction system and method utilizes shock waves to separate oil, water, and biomass from feedstock in a single step. In one embodiment, at least one pair of opposing transducer arrays are arranged in a shock wave extraction housing and collectively powered by a pulse controller to create controllable shearing planes and/or shearing regions and/or shock stem zones to interact upon a flow path of feedstock as the feedstock travels through the shock wave housing.

20 Claims, 6 Drawing Sheets

VARIABLE SHOCK WAVE BIO-OIL EXTRACTION SYSTEM

STATEMENT OF GOVERNMENT INTEREST

The invention described herein may be manufactured and used by or for the Government of the United States of America for governmental purposes without the payment of any royalties.

CROSS REFERENCE TO OTHER PATENT APPLICATIONS

None.

BACKGROUND OF THE INVENTION (1) Field of the Invention

The present invention relates generally to bio-fuel systems and, more specifically in one embodiment, to a bio-oil extraction system for extracting oil found within the cells of algae while simultaneously separating the oil, water and algae husk in one step for efficient processing into bio-oil by means of variable shock on shock interaction.

(2) Description of the Prior Art

Bio-fuels are fuels that are derived from biological feedstock sources such as trees, corn, miscanthus and algae. These bio-fuels have been sought out as an alternative to fossil fuels to decrease dependence on fossil fuels, stabilize the price of oil, and reduce the carbon footprint from the use of fossil fuels. Fossil fuels are primarily produced from hydrocarbons extracted from below the earth's surface. Much of this crude comes from foreign sources, which represents a security and price risk to the United States economy in general. Furthermore, military operations require a stable source of power when conducting overseas operations, particularly in remote or hostile areas.

Of the various types of feedstock, algae shows the greatest promise because it is sustainable in a majority of growing regions and can produce a nearly 100 fold yield per acre compared with other feedstock sources. However, this increased yield is costly in that only expensive filtering and thermal cracking means have been employed to extract the oil from the algae.

United States patent application 20110095225, published Apr. 28, 2011 to Eckelberry, et al., discloses methods, systems, and apparatuses for extracting non-polar lipids from microalgae using a lipid extraction device having an anode and a cathode that forms a channel, and defines a fluid flow path through which an aqueous slurry is passed. An electromotive force is applied across the channel at a gap distance in a range from 0.5 mm to 200 mm to cause the non-polar lipids to be released from the algae cells. The non-polar lipids can be extracted at a high throughput rate and with low concentrations of polar lipids such as phospholipids and chlorophyll.

One problem with this prior art is it requires a large amount of power to force an electrical current through the aqueous slurry, which is highly resistant due to the water present in the slurry.

Hielscher GmBh, a company out of Teltow, Germany, proposes using ultrasound to fracture various crops and extract the oil by means of bubble cavitation techniques.

However, the present invention simplifies oil extraction using lower power demand and flow through processing thereby reducing the cost of facility construction and operation. Accordingly, those of skill in the art will appreciate the present invention, which addresses the above discussed and other problems.

SUMMARY OF THE INVENTION

It is one possible object of the present invention to provide an improved bio-oil extraction system generating a greater yield of biofuel from feedstock.

Another possible object of the present invention is to provide a more efficient bio-oil extraction system having a lower power demand compared with currently used techniques.

Another possible object of the invention is to provide a bio-oil extraction system requiring only one step for separating oil, water, and husk from algae cells and/or other feedstock.

Another possible object of the invention is to provide a bio-oil extraction system which utilizes colliding shock waves to extract biofuel from feedstock.

Another possible object of the invention is to provide a bio-oil extraction system which utilizes sonic waves produced by opposing transducer arrays to extract biofuel from feedstock.

Other objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

In accordance with one embodiment of the present invention, a variable shock wave bio-oil extraction system and method is disclosed which may comprise a first acoustic transducer array comprising a first plurality of acoustic transducers and a second acoustic transducer array comprising a second plurality of acoustic transducers mounted to a shock wave housing.

In one embodiment, the first plurality of acoustic transducers and the second plurality of acoustic transducers may be oriented to produce a first plurality of acoustic waves and a second plurality of acoustic waves inwardly into the shock wave housing, whereby the first plurality of acoustic waves encounter the second plurality of acoustic waves within the shock wave housing.

In one embodiment of the present invention, a pulse controller varies a timing of production of the first plurality of acoustic waves and the second plurality of acoustic waves to vary positions within the shock wave housing at which the first plurality of acoustic waves encounter the second plurality of acoustic waves. These interactions thereby create selectable position shearing regions within the shock wave housing to separate oil, water, and biomass from the feedstock.

In one embodiment of the present invention, the pulse controller is operable to create the selectable position shearing regions along an entire cross-section of the flow path.

The shock wave housing further defines a flow path to permit continuous flow of feedstock through the shock wave housing with an inlet for receiving the feedstock and an outlet for passing the oil, water, and biomass out of the shock wave housing. In one possible embodiment, the first plurality of acoustic transducers and the second plurality of acoustic transducers are mounted between the inlet and the outlet.

In a preferred embodiment, the pulse controller is operable to provide a variable firing rate for each of the first plurality of acoustic transducers and the second plurality of acoustic transducers of between 2 and 100 milliseconds. The first acoustic transducer array and the second acoustic transducer array may be positioned on substantially opposite sides with respect to each other on the shock wave housing.

The pulse controller may be configured to selectively fire all of the first plurality of acoustic transducers of the first acoustic transducer array with a first timing and all of the second transducers of the second acoustic transducer array at a second timing. In another embodiment, the pulse controller may be configured to selectively fire individual and/or groups of the acoustic transducers at selected timings.

In one embodiment, the first plurality of acoustic transducers and the second plurality of acoustic transducers may comprise an axis oriented perpendicular with respect to the flow path. In another embodiment, the first plurality of acoustic transducers and the second plurality of acoustic transducers comprise an axis being oriented at an angle less than ninety degrees with respect to the flow path.

In another embodiment, the system may further comprise a third acoustic transducer array and a fourth acoustic transducer array and/or additional arrays mounted to the shock wave housing.

In operation, a method for a variable shock wave bio-oil extraction system is disclosed which may comprise providing a shock wave extraction housing. Other steps may include providing a first acoustic transducer array comprising a first plurality of acoustic transducers and a second acoustic transducer array comprising a second plurality of acoustic transducers mounted to the shock wave housing, and orientating the first plurality of acoustic transducers and the second plurality of acoustic transducers to produce a first plurality of acoustic waves and a second plurality of acoustic waves inwardly into the shock wave housing, whereby the first plurality of acoustic waves produced by the first plurality of acoustic transducers encounter the second plurality of acoustic waves produced by the second plurality of acoustic transducers within the shock wave housing.

In a preferred embodiment of the present invention, the method may comprise varying a timing of production of the first plurality of acoustic waves and the second plurality of acoustic waves to vary positions within the shock wave housing at which the first plurality of acoustic waves encounter the second plurality of acoustic waves. These interactions thereby create selectable position shearing regions within the shock wave housing to separate oil, water, and biomass from the feedstock.

In one embodiment, the method may comprise creating the selectable position shearing regions along an entire cross-section of the flow path.

In another embodiment, the method may comprise providing continuous flow of feedstock through the shock wave housing.

In a preferred embodiment, the pulse controller is operable to provide a variable firing rate for each of the first plurality of acoustic transducers and the second plurality of acoustic transducers of between 2 and 100 milliseconds. Other steps may comprise positioning the first acoustic transducer array and the second acoustic transducer array on substantially opposite sides with respect to each other on the shock wave housing.

In another embodiment, the method may comprise configuring the pulse controller to selectively fire all of the first plurality of acoustic transducers of the first acoustic transducer array with a first timing and all of the second transducers of the second acoustic transducer array at a second timing.

In another embodiment, the method comprises selectively firing individual acoustic transducers at selectable timings.

In one embodiment, the method may comprise applying the shock wave substantially perpendicular to the flow path. In another embodiment, the method may comprise orienting the shock wave to encounter the flow path at an angle less than ninety degrees with respect to the flow path.

In another embodiment, the method may comprise providing four, six, or more transducer arrays around the shock housing.

DETAILED DESCRIPTION OF THE INVENTION

Figure 1:
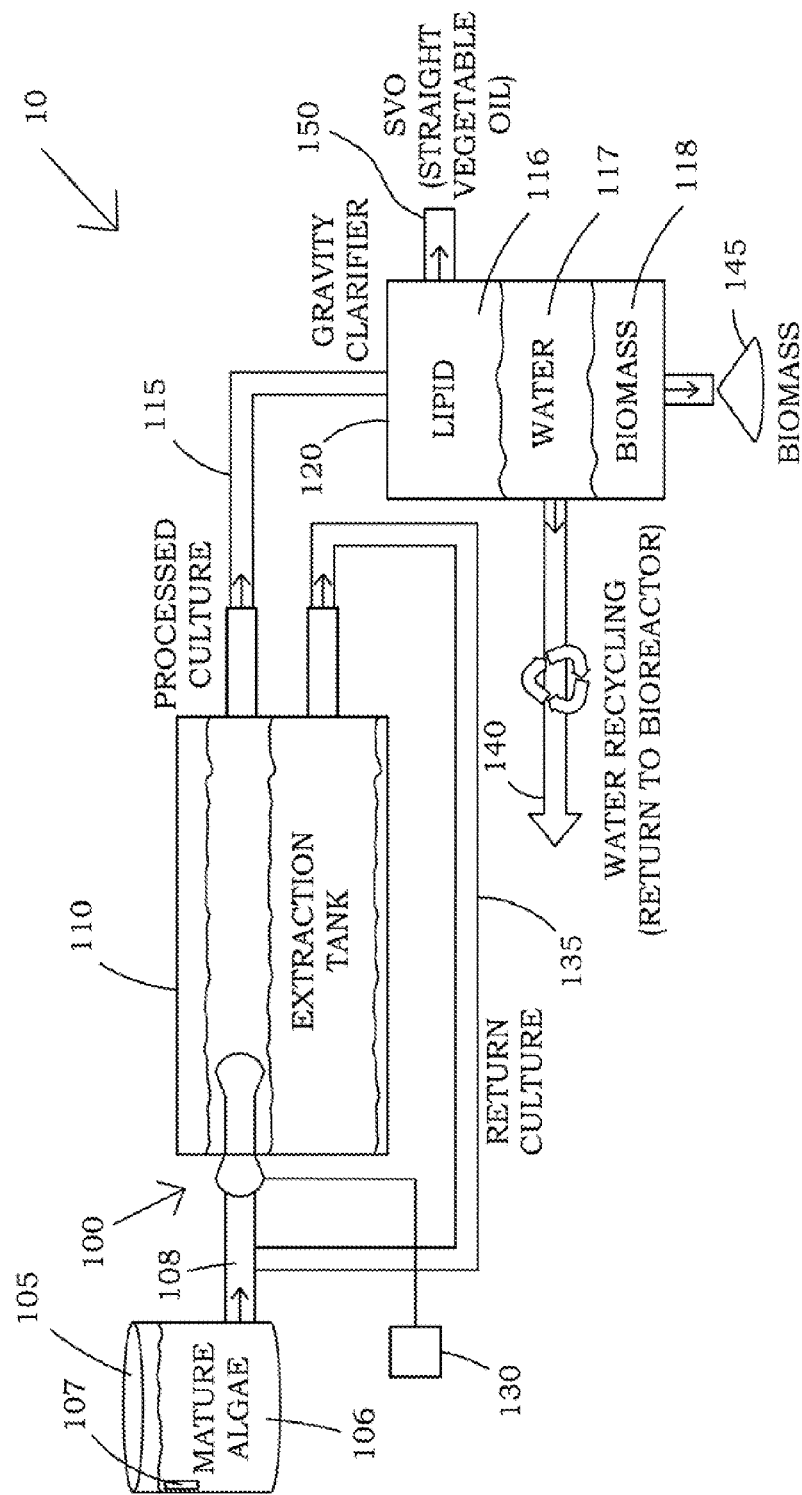
FIG. 1 is a schematic view of a bio-oil extraction system that may include a feedstock source, a sonic shock wave extraction housing with opposed transducers, an extraction tank, a gravity clarifier, and a pulse controller in accord with one possible embodiment of the invention.

Referring now to the drawings and, more particularly to FIG. 1, there is shown a schematic view of one possible bio-oil extraction system 10 that may include shock wave bio-oil extraction housing 100, extraction tank 110, gravity clarifier tanks 120, and pulse controller 130 in accord with one possible embodiment of the invention.

It will be noted that shock wave housing 100 is not limited to the configuration of any particular extraction system, such as that of bio-extraction system 10. In one possible embodiment, bio-oil extraction system 10 or possibly other configurations thereof implement the feed shock wave housing 100, the capture, and the continued refinement of separation of oil from the feedstock for ease of reference and explanation.

In this embodiment, algae tank 105 houses a quantity of mature algae 106 to be used in bio-oil extraction system 10. In one embodiment, algae tank 105 may be augmented with $CO_2$ nourishing system 107 to increase the volume of mature algae 106 present in algae tank 105. Algae tank 105 is provided with outlet pipe 108 and corresponding valves and/or controls that allow mature algae 106 to flow via gravity or pump into shock wave bio-oil extraction housing 100.

Figure 2:
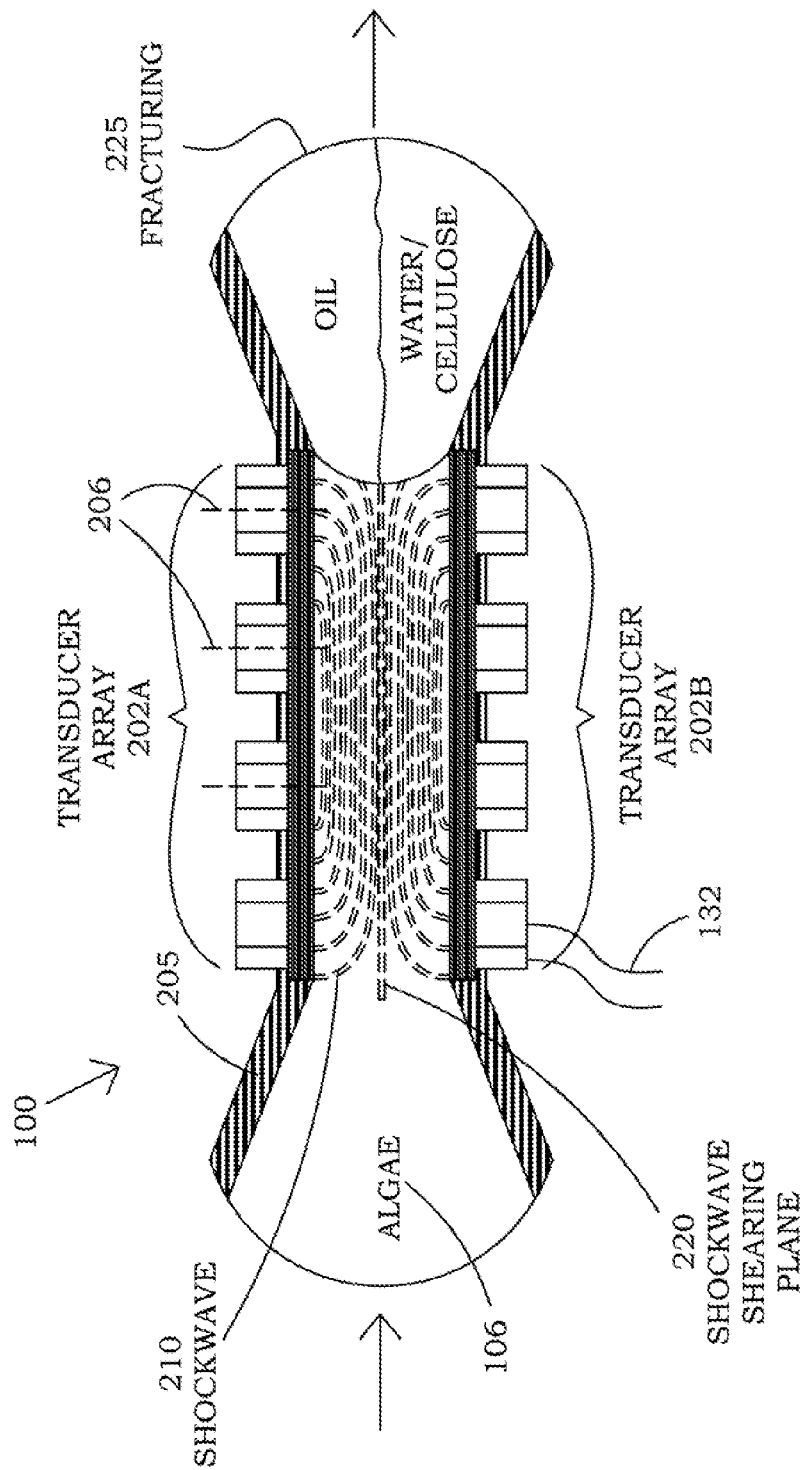
FIG. 2 is an enlarged view, partially in cross-section, of the extraction housing of FIG. 1 showing one possible set of opposed sonic transducer arrays in accord with one possible embodiment of the invention.

Turning now to FIG. 2, there is shown a schematic view in cross-section of shock wave bio-oil extraction housing 100 in accord with one possible embodiment of the invention. In this embodiment, shock wave bio-oil extraction housing 100 comprises walls 205 that support opposing high powered transducer arrays. The cross-sectional view of FIG. 2 shows one possible set of opposing arrays 202A, 202B but numerous arrays may be built into the walls 205 of shock wave housing 100 without departing from the scope of the invention. Pulse controller 130 may utilize various power lines 132 to connect to the transducer arrays. Pulse controller 130 modulates the frequency and pulse rate of opposing transducer arrays, such as opposing transducer arrays 202A, 202B to break down the algae cell, releasing water, biomass, and most importantly bio-oil. Opposing transducer arrays 202A, 202B may comprise high powered transducer arrays such as those found in lithotripsy medical equipment and naval sonar systems.

In operation, mature algae 106 flow out of algae tank 105 to shock wave bio-oil extraction housing 100. The water algae slurry enters the housing as pulse controller 130 excites transducers 202A, 202B. Transducers 202A, 202B induce sonic waves 210 of selectable frequencies to impinge upon mature algae 106 cells. Sonic waves 210, including hyper-sonic and ultra-sonic, from opposing transducer arrays 202A, 202B and equal harmonics travel through the water column and collide. Opposing transducer arrays 202A, 202B each have axis 206, which in this embodiment is perpendicular with respect to the flow path of feedstock. In one possible embodiment, depending on construction of the transducers, axis 206 can define the path or main direction along which the power of the sonic waves 210 will travel from opposing transducer arrays 202A, 202B. As used herein, the axis of the transducer is representative of the direction of travel of the power of the sonic waves utilized as described herein. At the collision line of the sonic waves, shearing plane 220 is induced, which causes the cell walls of mature algae 106 to collapse together while the shock interaction creates a perpendicular shearing plane, both of which combine to separate the oil and water from the algae cell.

Using pulse controller 130 to vary the firing sequences, frequencies, and waveforms of opposing transducer arrays 202A, 202B, shearing plane 220 can be rapidly induced throughout the entire water column to effectively and efficiently separate oil, or lipids, from water and husk by-products of mature algae 106.

Referring back to FIG. 1, shock wave bio-oil extraction housing 100 is connected downstream via tubular plumbing to extraction tank 110. Extraction tank 110 has top plumbing exit 115 and bottom plumbing exit 135 near the bottom. Top plumbing exit 115 feeds the processed algae to clarifier tank 120, while bottom plumbing exit 135 returns any mature algae 106 remaining in extraction tank 110 back to be processed again through shock wave bio-oil extraction housing 100.

Given enough time in extraction tank 110, separate layers of oil, water, and biomass would form over time due to gravity separation. However, since a continuous process is desirable, the processed culture is sent to one or more clarifier tanks 120 to provide for gravity separation, allowing extraction tank 110 to continue processing mature algae 106. The processed culture flows downstream into clarifier tanks 120 whereby the partially settled mix is allowed to fully separate via gravity. After sufficient time, oil 116 is extracted from the top layer into line or holding tank 150. Water 117 may be piped back via line or water holding tank 140 for recycling. Any biomass 118 remaining in clarifier tanks 120 is directed into hopper 145. The remaining biomass 118 collected in hopper 145 can be used for many other agricultural purposes or cellulose feedstock for refining cellulose into bio-fuel.

In another embodiment, the induction of air bubbles (not shown) in extraction tank 110 can be utilized to further speed up the separation of oil from the water slurry.

Figure 2A:
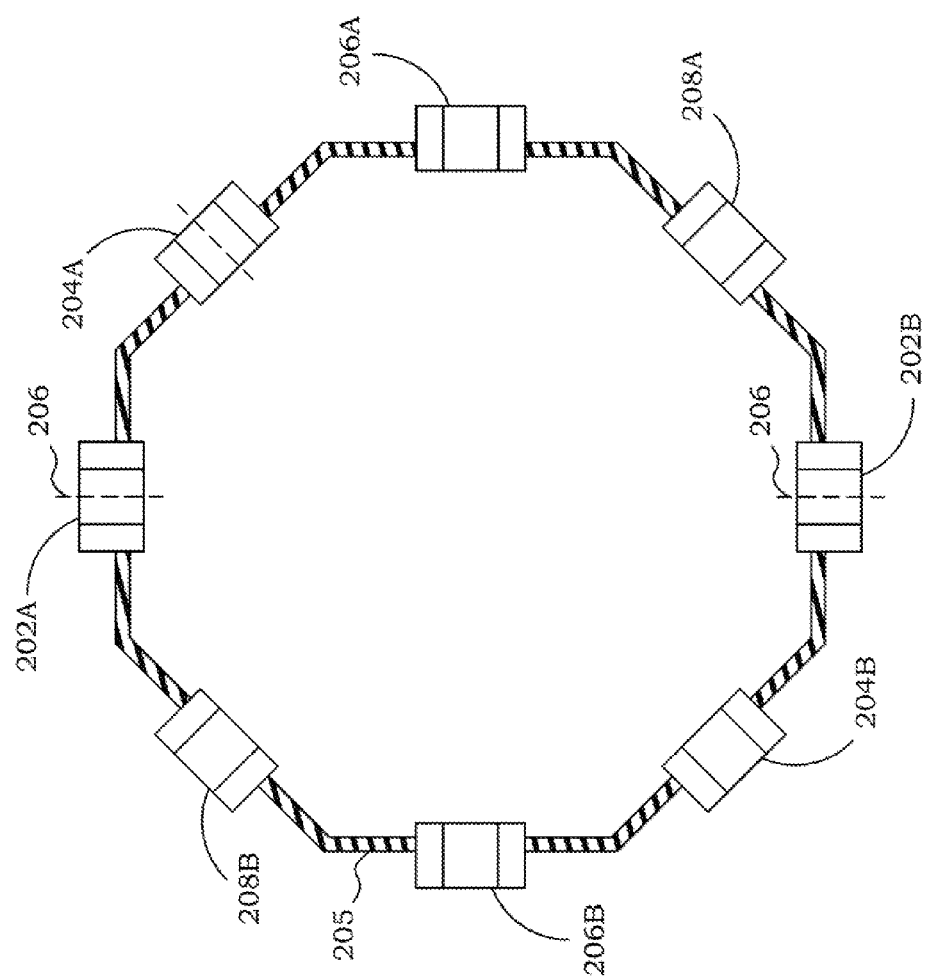
FIG. 2A is an end view, partially in cross-section, of one possible embodiment of the extraction housing of FIG. 2 comprising multiple opposed sonic transducer arrays in a vortex firing arrangement in accord with one possible embodiment of the present invention.

FIG. 2A depicts a transducer array torroidal vortex firing arrangement in accord with one possible embodiment of the present invention. In this embodiment, the firing of opposing transducer arrays 202A, 202B are directly perpendicular to the algae-water flow. The firing timing of opposing transducer arrays 202A, 202B can be varied such that transducer arrays 202A at the top and transducer arrays 202B at the bottom fire at variable predetermined timing sequences such that the collision of the shock waves can occur rapidly and sequentially along the entire cross-section of fluid flow. As discussed herein, axis 206 defines the path along which the herein discussed power of sonic waves 210 will travel from opposing transducer arrays 202A, 202B. Additionally, individual opposing transducer pairs, not entire arrays, may be fired at different timings along the length of the flow to induce shock wave effects along the entire flow cross section. Note that an infinite number of firing sequences are possible and an infinite number of opposing array surfaces are possible.

In the embodiment depicted, an octagonal profile is used for transducer arrays 202A, 202B, 204A, 204B, 206A, 206B, 208A, and 208B. However, other profiles are possible such as but not limited to hexagonal, square and even circular profiles. Furthermore, the number of opposing transducer arrays is not limited to a particular number and multiple arrays could be used consistent with the teachings of the present invention.

Figure 3:
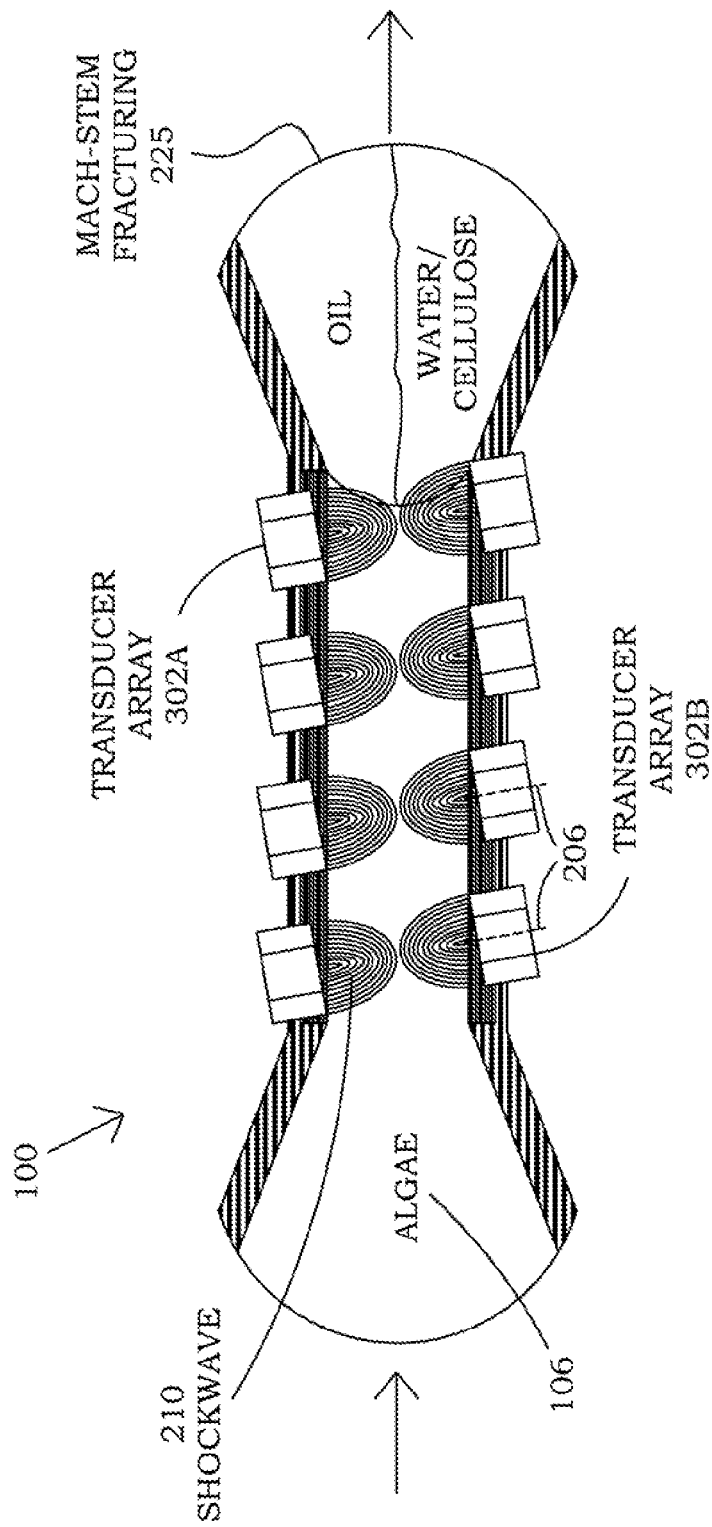
FIG. 3 is a side view, partially in cross-section, of an extraction housing with another possible arrangement of transducer arrays in accord with one possible embodiment of the present invention.

FIG. 3 depicts another transducer array torroidal vortex firing arrangement in accord with another possible embodiment of the present invention. In this embodiment, opposing transducer arrays 302A, 302B are mounted with an angled axis, less than ninety degrees to the flow path, into housing 305 of shock wave bio-oil extraction housing 100. Pulse controller 130 is operable to fire opposing transducer arrays 302A, 302B in opposing pairs all at once, sequentially, left to right, right to left or in opposing torroidal sequence. Axis 206 of opposing transducer arrays 302A, 302B is not perpendicular with respect to the flow path of algae 106 as depicted in FIG. 2, but rather is angled at less than 90 degrees with respect to the flow path. Shock wave harmonics, as discussed hereinbefore, ensures that most of the transducer energy is concentrated at the shear plane and thus less energy per transducer is needed to effect shearing of mature algae 106 than would be needed as compared to transducer systems that only use one-dimensional arrays. In a preferred embodiment, firing rates would be between 2 and 100 milliseconds. Firing frequencies and pulse shapes are in the ultrasonic and hypersonic regime but are not limiting upon the range of frequencies possible for cellular destruction of algae cells. In a preferred embodiment, pulse harmonic frequencies in the range of 1 Hz to 1000 MHz will be useful. Cavitation and micro bubble formation are also secondary positive effects of this process, but are ancillary to shearing region effect, which increases the efficiency of bio-oil extraction.

Figure 4:
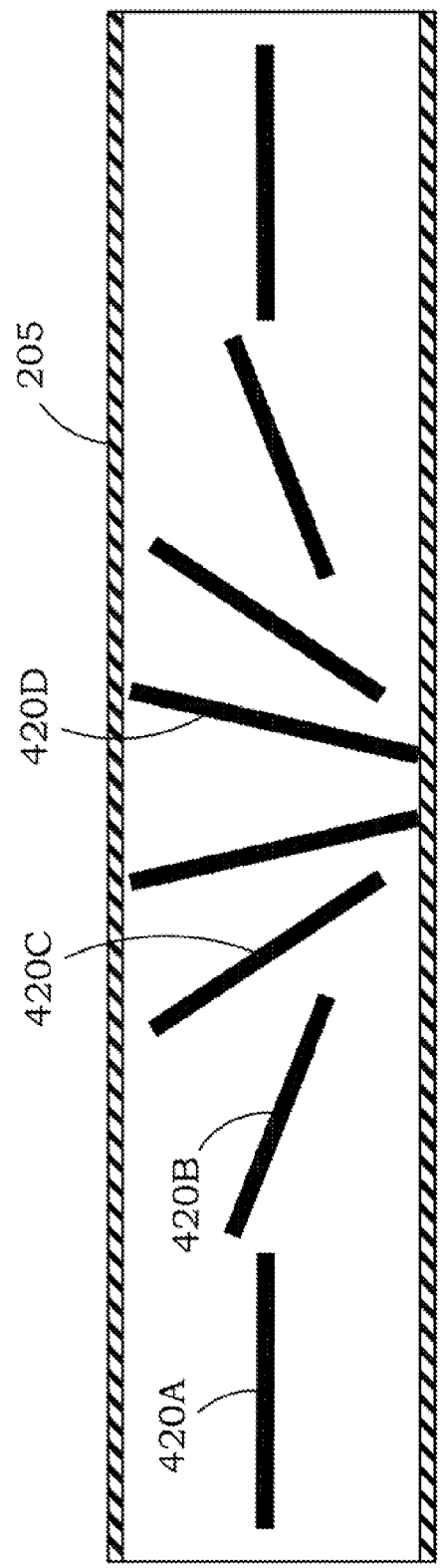
FIG. 4 is a side view, in cross-section, of an extraction housing such as that of FIG. 2 or FIG. 3 with possible selectively controllable and/or moveable shock stem zones or shearing regions in accord with one possible embodiment of the present invention.

Referring to FIG. 4, a side view of possible moveable shock stem zones or shearing regions created by the shock waves is shown in accord with one possible embodiment of the present invention. Similar to shearing plane 220 as described in FIG. 2, stem shock zones or shearing regions 420A, 420B, 420C, 420D are additional shearing planes generated by the system. The location and angles of the shearing planes will change depending upon the shape of housing 205, as well as the arrangement of transducer arrays 202A, 202B, and the timing.

Figure 5:
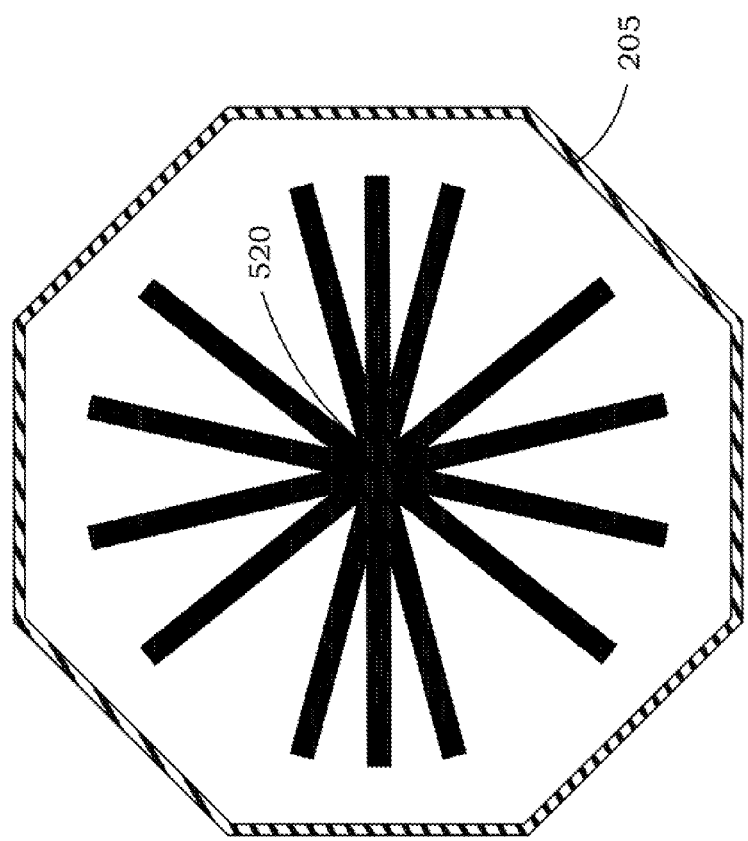
FIG. 5 is an end view, in cross-section, of an extraction housing such as that of FIG. 2 or FIG. 3 with possible selectively controllable and/or moveable shock stem zones or shearing regions in accord with one possible embodiment of the present invention.

FIG. 5 depicts an end view of shock stem zones or shearing regions in accord with one possible embodiment of the present invention. In this configuration, the central region at 520 illustrates that the most concentrated shearing plane or region will be located in the center flow path of housing 205 and will extend into the page. However, the shearing planes and/or regions can be moveable with timing of the transducers allowing various concentration points and/or planes to be produced over the entire cross-section of the flow path, as discussed above. The locations and movement of stem shock zones or shearing regions 520 also depend upon the number of opposing transducer arrays and their firing arrangements.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A bio-oil extraction system which utilizes acoustic shock waves to separate oil, water, and biomass from feedstock, comprising:
    a shock wave housing;
    a first acoustic transducer array comprising a first plurality of acoustic transducers and a second acoustic transducer array comprising a second plurality of acoustic transducers mounted to said shock wave housing, said first plurality of acoustic transducers and said second plurality of acoustic transducers being oriented to produce a first plurality of acoustic waves and a second plurality of acoustic waves inwardly into said shock wave housing, whereby said first plurality of acoustic waves produced by said first plurality of acoustic transducers encounter said second plurality of acoustic waves produced by said second plurality of acoustic transducers within said shock wave housing;
    a pulse controller operably connected to said first acoustic transducer array and said second acoustic transducer, said pulse controller being operable for varying a timing of production of said first plurality of acoustic waves and said second plurality of acoustic waves to vary positions within said shock wave housing at which said first plurality of acoustic waves encounter said second plurality of acoustic waves to thereby create selectable position shearing regions within said shock wave housing to separate said oil, said water, and said biomass from said feedstock.

2. The system of claim 1, wherein said shock wave housing further defines a flow path to permit continuous flow through said shock wave housing with an inlet for receiving said feedstock into said shock wave housing and an outlet for passing said oil, said water, and said biomass out of said shock wave housing, said first plurality of acoustic transducers and said second plurality of acoustic transducers being mounted between said inlet and said outlet.

3. The system of claim 2, wherein said pulse controller is operable to create said selectable position shearing regions along an entire cross-section of said flow path.

4. The system of claim 3, wherein said pulse controller is operable to provide a variable firing rate for each of said first plurality of acoustic transducers and said second plurality of acoustic transducers of between 2 and 100 milliseconds.

5. The system of claim 2, wherein said first plurality of acoustic transducers and said second plurality of acoustic transducers comprise an axis, said axis being oriented perpendicular with respect to said flow path.

6. The system of claim 2, wherein said first plurality of acoustic transducers and said second plurality of acoustic transducers comprise an axis, said axis being oriented at an angle less than ninety degrees with respect to said flow path.

7. The system of claim 1, wherein said first acoustic transducer array and said second acoustic transducer array are positioned on substantially opposite sides with respect to each other on said shock wave housing.

8. The system of claim 7, wherein said pulse controller is configured to selectively fire all of said first plurality of acoustic transducers of said first acoustic transducer array with a first timing and all of said second plurality of transducers of said second acoustic transducer array at a second timing.

9. The system of claim 7, wherein said pulse controller is configured to selectively fire individual ones of said first plurality of acoustic transducers of said first acoustic transducer array and individual ones of said second transducers of said second acoustic transducer array.

10. The system of claim 1, further comprising a third acoustic transducer array and a fourth acoustic transducer array mounted to said shock wave housing, said pulse controller being operably connected to said third acoustic transducer array and said fourth acoustic transducer.

11. A bio-oil extraction method which utilizes acoustic shock waves to separate oil, water, and biomass from feedstock, comprising:
    providing a shock wave housing;
    mounting a first acoustic transducer array comprising a first plurality of acoustic transducers and a second acoustic transducer array comprising a second plurality of acoustic transducers to said shock wave housing, said first plurality of acoustic transducers and said second plurality of acoustic transducers being oriented to produce a first plurality of acoustic waves and a second plurality of acoustic waves inwardly into said shock wave housing, whereby said first plurality of acoustic waves produced by said first plurality of acoustic transducers encounter said second plurality of acoustic waves produced by said second plurality of acoustic transducers within said shock wave housing;
    operably connecting a pulse controller to said first acoustic transducer array and said second acoustic transducer array; and
    utilizing said pulse controller for varying a timing of production of said first plurality of acoustic waves and said second plurality of acoustic waves to vary positions within said shock wave housing at which said first plurality of acoustic waves encounter said second plurality of acoustic waves to thereby create selectable position shearing regions within said shock wave housing to separate said oil, said water, and said biomass from said feedstock.

12. The method of claim 11, further comprising:
    defining a flow path through said shock wave housing, said flow path comprising an inlet for receiving said feedstock into said shock wave housing and an outlet for passing said oil, said water, and said biomass out of said shock wave housing; and
    providing a continuous flow of feedstock through said shock wave housing via said flow path.

13. The method of claim 12, further comprising utilizing said pulse controller to create said selectable position shearing regions along an entire cross-section of said flow path.

14. The method of claim 13, further comprising utilizing said pulse controller to provide a variable firing rate for each of said first plurality of acoustic transducers and said second plurality of acoustic transducers of between 2 and 100 milliseconds.

15. The method of claim 12, wherein said step of mounting further comprises mounting said first plurality of acoustic transducers and said second plurality of acoustic transducers along an axis, said axis being oriented perpendicular with respect to said flow path.

16. The method of claim 12, wherein said step of mounting further comprises mounting said first plurality of acoustic transducers and said second plurality of acoustic transducers along an axis, said axis being oriented at an angle less than ninety degrees with respect to said flow path.

17. The method of claim 11, further comprising positioning said first acoustic transducer array and said second acoustic transducer array on substantially opposite sides with respect to each other on said shock wave housing.

18. The method of claim 17, further comprising utilizing said pulse controller to selectively fire all of said first plurality of acoustic transducers of said first acoustic transducer array with a first timing and all of said second transducers of said second acoustic transducer array at a second timing.

19. The method of claim 17, further comprising utilizing said pulse controller to selectively fire individual ones of said first plurality of acoustic transducers of said first acoustic transducer array at a first timing and individual ones of said second transducers of said second acoustic transducer array at a second timing.

20. The method of claim 11, further comprising mounting a third acoustic transducer array and a fourth acoustic transducer array to said shock wave housing, said pulse controller being operably connected to said third acoustic transducer array and said fourth acoustic transducer.

\* \* \* \* \*